United States Patent Office 2,894,952
Patented July 14, 1959

2,894,952

INDENONES SUBSTITUTED BY QUINOLYL, PYRIDYL AND BENZIMIDAZOLYL RADICALS

Edward D. Amstutz, Bethlehem, Pa., and Geraldine Lynch Krueger, Cincinnati, Ohio, assignors to The Wm. S. Merrell Company No Drawing. Application September 11, 1957
Serial No. 683,214

7 Claims. (Cl. 260—289)

Our invention relates to certain novel 2-aryl-2 heterocyclic-1-indenones which are useful as anti-inflammatory agents.

The novel compounds of our invention have the formula

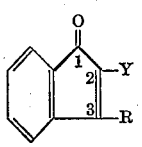

wherein R is a phenyl, lower alkyl phenyl, lower alkoxy phenyl or halophenyl radical and Y is a 2-pyridyl, 2-quinolyl or 2-benzimidazolyl radical. By lower alkyl and lower alkoxy we mean such groups containing 1 to 4 carbon atoms. Preferred halogens are chlorine and bromine.

The novel compounds are useful in the treatment of inflammatory diseases such as rheumatoid arthritis, in the reversal of acute inflammatory lesions such as inflammatory diseases of the eye, and for topical application in inflammation of the skin and mucous membranes such as vaginitis. The compounds do not have hormone-like activity as do many other anti-inflammatory agents.

Some of the new compounds are suitable for oral and parenteral administration and some are useful only orally or only parenterally. The compounds are useful as the free bases or as the acid addition salts of acids such as hydrochloric, sulfuric and phosphoric acids. For either oral or parenteral administration they are useful in dosages within the range of about 250 mg. to about 1 gram daily. All of the compounds are useful topically and for this method of administration they can be incorporated into creams, ointments or lotions in concentrations varying from about 1 to 10 percent.

The new compounds are prepared by reacting the corresponding indandione substituted with the desired Y radical with a compound prepared from lithium and a compound containing the desired R radical to produce the intermediate indanone followed by dehydration to the desired indenone, i.e.

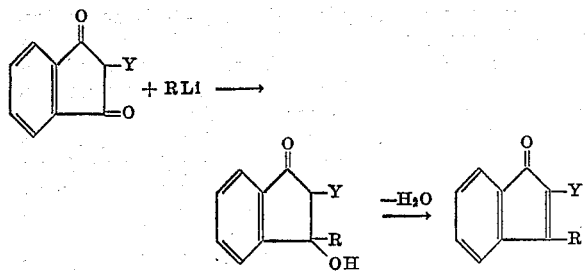

The compounds of our invention will be further illustrated by the following examples.

EXAMPLE 1

3-phenyl-2-(2-pyridyl)-1-indenone

Lithium filings (0.94 g., 0.136 g. atom) were placed into 50 cc. of ether. A solution of 10.52 g. (0.067 mole) of bromobenzene in 13 ml. of ether was added slowly to maintain gentle reflux. After the solution had cooled and most of the lithium had disappeared, 4.46 g. (0.02 mole) of pyrophthalone (von Huber, Ber., 36, 1653 [1903]) was added over one-half hour. The solution was stirred one hour and refluxed for an additional hour. Water was added, and the ether allowed to distill as 10% $H_2SO_4$ was used to acidify the solution. A yellow solid separated which was filtered, washed with 10% $H_2SO_4$, and with water until acid free. The precipitate was washed with boiling toluene repeatedly until the washings were pale yellow. The residue weighed 4.8 g. (80%) and melted at 134° C. with vigorous decomposition. After recrystallization from 95% EtOH, the intermediate, 3 - hydroxy - 3 - phenyl - 2- (2 - pyridyl) - 1-indanone, melted at 142.2°–142.8° C.

*Analysis.*—Calcd. for $C_{20}H_{15}O_2N$: C, 79.99; H, 4.69. Found: C, 78.08; H, 4.95.

Evidently there was some water of crystallization present that could not be removed without concurrent dehydration.

A quantitative yield of desired product resulted when 3 - hydroxy - 3 - phenyl - 2 - (2 - pyridyl) - 1 - indanone was heated above its melting point until no yellow color remained and vigorous evolution of water ceased. The red-orange solid 3-phenyl-2-(2-pyridyl)-1-indenone was recrystallized from 50% EtOH—$H_2O$ to give plates melting at 129.8°–130.8° C.

*Analysis.*—Calcd. for $C_{20}H_{13}ON$: C, 84.8; H, 4.64. Found: C, 84.9; H, 4.92.

Picrate: M.P.=198–199.4° C., N anal.: 10.7 (calcd.: 11.1).

Oxime: M.P.=185–186.5° C., N anal.: 9.68 (calcd.: 9.41).

The compound exhibits anti-inflammatory activity and is useful orally and topically.

EXAMPLE 2

3-(p-methoxyphenyl)-2-(2-pyridyl)-1-indenone

The intermediate 3-hydroxy-3-(p-methoxyphenyl)-2-(2-pyridyl)-1-indanone was prepared by the following procedure: To 1.1 g. (0.16 g. atom) of lithium in 50 ml. of dry ether was added a solution of 15 g. (0.08 mole) of p-bromoanisole in 25 ml. of dry ether. The addition was carried out at a rate just sufficient to maintain gentle reflux. After addition was complete, stirring was continued until very little lithium remained. To the solution was added, with stirring, 4.46 g. (0.02 mole) of solid pyrophthalone, and the mixture stirred and refluxed for one hour. The solution was hydrolyzed with an excess of a dilute $NH_4Cl$ solution. The yellow solid which separated was washed with hot water until it left no ash upon ignition and imparted no crimson color to the bunsen flame. The solid was then washed with ether to remove the excess anisole. The solid was soluble in ethanol, slightly soluble in ether, and insoluble in water. It melted at 159°–160°: yield: 70% of yellow crystals.

*Analysis.*—Calcd. for $C_{21}H_{17}O_3N$: C, 76.12; H, 5.17. Found: C, 75.88; H, 5.35.

This intermediate compound exhibits anti-inflammatory activity and is useful orally, parenterally and topically and can be used in the dosages and for the uses described above.

The above hydroxy compound was dehydrated by heating it slightly above its melting point until no yellow color remained and vigorous evolution of water ceased. The crude desired product was recrystallized from dilute ethanol to yield orange-brown flakes of 3-(p-methoxyphenly)-2-(2-pyridyl)-1-indenone melting at 155.5°–156° C.

Analysis.—Calcd. for $C_{21}H_{15}O_2N$: C, 80.52; H, 4.83. Found: C, 80.06; H. 4.70.

This compound exhibits anti-inflammatory activity and is useful orally and topically.

EXAMPLE 3

3-(p-tolyl)-2-(2-pyridyl)-1-indenone

The intermediate 3-hydroxy-3-(p-tolyl)-2-(2-pyridyl)-1-indanone was prepared by the procedure of the first part of Example 2 using 13.7 g. (0.08 mole) of p-bromotoluene, 1.1 g. (0.16 gram atom) of lithium, and 4.46 g. (0.02 mole) of pyrophthalone. The crude product could not be satisfactorily recrystallized and melted over a range of about 150°–155°.

Analysis.—Calcd. for $C_{21}H_{17}O_2N$: C, 79.99; H, 5.39. Found: C, 79.70; H, 5.43.

The above hydroxy compound was dehydrated by heating at about 160° in an oil bath until evolution of vapor ceased. The residue was dissolved in ethanol and precipitated by addition of water. The precipitate was recrystallized from methanol to yield the desired product of 3-(p-tolyl)-2-(2-pyridyl)-1-indenone in form of bright red flakes; M.P. 155°–156°.

Analysis.—Calcd. for $C_{21}H_{15}ON$: C, 84.83; H, 5.08; N, 4.71. Found: C, 84.95; H, 5.07; N, 4.66.

This compound exhibits anti-inflammatory activity and is useful orally, topically and parenterally.

EXAMPLE 4

3-(m-tolyl)-2-(2-pyridyl)-1-indenone

The intermediate 3-hydroxy-3-(m-tolyl)-2-(2-pyridyl)-1-indanone was prepared by the procedure of the first part of Example 2 using 13.7 g. (0.08 mole) of m-bromotoluene, 1.1 g. (0.16 gram atom) of lithium, and 4.46 g. (0.02 mole) of pyrophthalone. The yield of yellow solid melting at 130°–145° was about 75%.

Analysis.—Calcd. for $C_{21}H_{17}O_2N$: C, 79.99; H, 5.39. Found: C, 80.00; H, 5.40.

The above hydroxy compound was dehydrated by heating at 150° in an oil bath. The residue was recrystallized twice from diethyl ether to yield to desided product 3-(m-tolyl)-2-(2-pyridyl)-1-indenone as an orange solid melting at 100°–103° C.

Analysis.—Calcd. for $C_{21}H_{15}ON$: C, 84.83; H, 5.08; N, 4.71. Found: C, 85.20; H, 5.42; N, 4.53.

Dehydration by refluxing the hydroxy compound in nitroethane and recrystallization from ether gave a slightly purer desired product melting at 107°–110° C.

Analysis.—Found: C, 84.30; H, 5.10; N, 4.87.

This compound exhibits anti-inflammatory activity and is useful orally and topically.

EXAMPLE 5

3-(p-chlorophenyl)-2-(2-pyridyl)-1-indenone

The intermediate 3-hydroxy-3-(p-chlorophenyl)-2-(2-pyridyl)-1-indanone was prepared in the following manner: To a mixture of 1.7 g. (0.24 g. atom) of lithium in dry ether was added a solution of 16.5 g. (0.12 mole) of n-butyl bromide in dry ether. The addition was carried out over a 30 minute period and the reaction mixture stirred for an additional 90 mintues. The operation was carried out at a temperature of −10° C. and under an atmosphere of dry nitrogen. At the end of this time, the reaction mixture was cooled to −18° C. and a solution of 15.0 g. (0.08 mole) of p-bromochlorobenzene was added rapidly and the mixture stirred for ten minutes at room temperature. During this time, the color of the reaction mixture changed from blue-gray to pale yellow-green.

To the above p-chlorophenyllithium solution was added 4.46 g. (0.02 mole) of solid pyrophthalone, and the procedure described in the first part of Example 1 was followed. The yellow solid was produced in yields of 70–80% and decomposed in the range: 150°–160° C.

Analysis.—Calcd. for $C_{20}H_{14}O_2NCl$: C, 71.55; H, 4.17; Cl, 10.58. Found: C, 69.8; H, 4.90; Cl, 9.57.

This analysis indicates water of crystallization that could not be readily removed without the product decomposing by dehydration.

This hydroxy intermediate was dehydrated by heating in oil bath at about 180° C. until evolution of vapor ceased. The crude product thus obtained was recrystallized from methanol to give orange-yellow crystals of desired product 3-(p-chlorophenyl)-2-(2-pyridyl)-1-indenone melting at 135.5°–137.5° C. after drying over $P_2O_5$ at 100° C. under reduced pressure.

Analysis.—Calcd. for $C_{20}H_{12}ONCl$: C, 75.59, H, 3.78; Cl, 11.18. Found: C, 75.15; H, 4.40; Cl, 11.10.

This compound exhibits anti-inflammatory activity and is useful orally and topically.

EXAMPLE 6

3-phenyl-2-(2-quinolyl)-1-indenone

The intermediate 3-hydroxy-3-phenyl-2-(2-quinolyl)-1-indanone was prepared following the first part of the procedure of Example 2 using 58.5 g. (0.372 mole) of bromobenzene, 5.14 g. (0.744 gram atom) of lithium, and 25 g. (0.093 mole) of 2-(2-quinolyl)-1,3-indandione (J. Ogilvie, U.S. 1,963,374). The crude yellow product obtained amounted to 32.3 g. (99% yield) and melted at 182° dec.

Analysis.—Calcd. for $C_{24}H_{17}O_2N$: C, 82.00; H, 4.87. Found: C, 81.87; H, 4.98.

The above hydroxy intermediate was dehydrated by dissolving it in conc. hydrochloric acid followed by heating and stirring on the steam bath for 15 minutes. The resultant solution was cooled and then neutralized with dilute sodium hydroxide solution. The mixture was filtered, the precipitate washed with water and recrystallized from dilute ethanol to yield 29.4 g. (96%) of desired product 3-phenyl-2-(2-quinolyl)-1-idenone as orange crystals that decomposed at 125°–126° and melted at 220°.

The hydrochloride salt was prepared by dissolving the above base in hot butanone and adding an equivalent of hydrochloric acid. The solution was cooled and filtered. The orange-red crystals thus obtained melted at 151°–153°. A sample when dried over $P_2O_5$ in vacuum at 78° melted at 220°–228° and had the following analysis:

Analysis.—Calcd. for $C_{24}H_{15}ON \cdot HCl$: C, 77.95; H, 3.36; N, 3.79; Cl. 9.57. Found: C, 78.09; H, 4.40; N, 3.93; Cl, 9.28.

The compound exhibits anti-inflammatory activity and is useful orally and topically.

EXAMPLE 7

3-phenyl-2-(2-benzimidazolyl)-1-indenone

The intermediate 3-hydroxy-3-phenyl-2-(2-benzimidazolyl)-1-indanone was prepared by the first part of the procedure of Example 2 using 6.3 g. (0.04 mole) of bromobenzene, 0.55 g. (0.08 gram atom) of lithium, and 2.6 g. (0.01 mole) of 2-(2-benzimidazolyl)-1,3-indandione (J. Van Alphen, Rec. trav. chim., 59, 289 [1940]). The yield of crude product in form of pale yellow solid was 3.2 g. (94%); M.P. about 235° with decomposition starting at 100°. The product could not be readily recrystallized because of ease of dehydration.

Analysis.—Calcd. for $C_{22}H_{16}O_2N_2$: N, 8.23. Found: N, 7.45.

The above hydroxy intermediate was dehydrated by heating it in 20% hydrochloric acid with stirring on the steam bath. The bright red crystals thus obtained were collected at the filter, and washed with hot water, turning dark-red in the process. Recrystallization from nitroethane or glacial acetic acid gave the pure desired product 3 - phenyl - 2 - (2 - benzimidazolyl) - 1 - indenone melting at 255°–257° C.

*Analysis.*—Calcd. for $C_{22}H_{14}ON_2$ C, 81.95; H, 4.38; N, 8.74. Found: C, 81.75; H, 4.33; N, 8.81.

The compound exhibits anti-inflammatory activity and is useful orally, topically and parenterally.

The following examples illustrate suitable pharmaceutical compositions containing the new compounds. In these examples, the quantities are given for single units, it being understood that in actual practice, the dosage forms will be prepared in suitable quantities, and the amounts of the materials used adjusted accordingly.

EXAMPLE 8

*25 mg. tablets.*—25 mg. of 3-(p-tolyl)-2-(2-pyridyl)-1-indenone (Example 3), 4 mg. of powdered sugar, and 32 mg. of corn starch are mixed and granulated with 10% gelatin solution. The granulation is dried and ground to fine granules for tableting. About 1% magnesium stearate is added as a lubricant, together with sufficient corn starch to give a weight of 2.5 grains per tablet. The product is compressed on a single punch or rotary machine using a 9/32 inch punch.

EXAMPLE 9

*500 mg. tablets.*—500 mg. of 3-(p-tolyl)-2-(2-pyridyl)-1-indenone (Example 3) in finely powdered form is admixed with 60 mg. of corn starch and 100 mg. of powdered sugar and then granulated with 10% gelatin solution. The granulation is dried and ground to size suitable for tableting. About 1% magnesium stearate is added as a lubricant, together with sufficient corn starch to give a weight of 700 mg. per tablet. The product is compressed on a single punch or rotary machine using a 7/16 punch.

The tablets of Examples 8 and 9 may be suitably coated if desired, as, for example, with sugar.

EXAMPLE 10

*Capsule.*—25 mg. of 3-(p-tolyl)-2-(2-pyridyl)-1-indenone (Example 3) is mixed with corn starch in quantity required to provide sufficient bulk for the desired size capsule, and the mixture is encapsulated.

EXAMPLE 11

*Capsule.*—500 mg. of 3-(p-tolyl)-2-(2-pyridyl)-1-indenone (Example 3) is admixed with sufficient corn starch to give the proper bulk for the desired size capsule, and the mixture is encapsulated.

EXAMPLE 12

*Injectable suspension, 100 mg. per ml.*—The following ingredients are sterilized separately: 100 mg. of 3-(p-tolyl)-2-(2-pyridyl)-1-indenone (Example 3), 0.1 mg. of Tween 80 and q.s. corn oil to make a final volume of 1 ml. These ingredients are admixed aseptically. Particle size may be achieved by use of micronized material or by use of a ball mill, maintaining aseptic conditions. The above suspension may be administered subcutaneously and intramuscularly.

EXAMPLE 13

*Oral suspension, 25 mg. per 5 ml.*—150 mg. of Veegum H.V. is hydrated in about 3 ml. of water. 250 mg. of Tween 80, 25 mg. of 3-(p-tolyl)-2-(2-pyridyl)-1-indenone (Example 3), color and flavor as desired q.s. 5 ml. are added; the product is mixed well and homogenized.

EXAMPLE 14

*Oral suspension, 700 mg. per 15 ml.*—150 mg. of Veegum H.V. is hydrated in about 9 ml. of water; 500 mg. of Tween 80, 700 mg. of 3-(p-tolyl)-2-(2-pyridyl)-1-indenone (Example 3), color and flavor, as desired, and water q.s. 15 ml. are added; the product is mixed well and homogenized.

EXAMPLE 15

*1% ointment.*—To a melt of 1.5 lbs. of propylene glycol, 6.68 lbs. of polyethylene glycol 400 U.S.P. and 6.68 lbs. of carbowax 4000 U.S.P. is added 0.15 lb. of micropulverized 3 - (p - tolyl) - 2 - (2 - pyridyl) - 1 - indenone (Example 3). The product is stirred until almost solid and milled if necessary to a smooth ointment. Fill in suitable containers.

EXAMPLE 16

*10% ointment.*—To a melt of 1.5 lbs. of propylene glycol, 6 lbs. of polyethylene glycol 400 U.S.P. and 6 lbs. carbowax 4000 U.S.P. is added 1.5 lbs. of micropulverized 3-(p-tolyl)-2-(2-pyridyl)-1-indenone (Example 3). The product is stirred until almost solid and milled if necessary to a smooth ointment. Fill in suitable containers.

The other compounds of Examples 1 to 7 can be used in place of the compound of Example 3 in the pharmaceutical preparations of the above Examples 8 to 16 where the preparation is adapted to the indicated route of administration. For example, the compounds of Examples 1 to 7 including the intermediate of Example 2, can be used in the tablets, capsules, oral suspension and ointments of Examples 8 to 11 and 13 to 16 and the compounds of Examples 3, 7 and the intermediate of Example 2 can be used in the injectable suspension of Example 12.

We claim:

1. Compounds of the formula

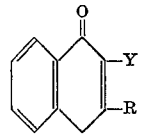

wherein R is selected from the class consisting of phenyl, lower alkylphenyl, lower alkoxyphenyl and halophenyl radicals and Y is selected from the class consisting of 2-pyridyl, 2-quinolyl and 2-benzimidazolyl radicals.

2. 3-phenyl-2-(2-pyridyl)-1-indenone.
3. 3-(p-tolyl)-2-(2-pyridyl)-1-indenone.
4. 3-(p-chlorophenyl)-2-(2-pyridyl)-1-indenone.
5. 3-phenyl-2-(2-quinolyl)-1-indenone.
6. 3-(p-methoxyphenyl-2-(2-pyridyl)-1-indenone.
7. 3 - (p - methoxyphenyl) - 3 - hydroxy - 2 - (2 - pyridyl)-1-indanone.

References Cited in the file of this patent

UNITED STATES PATENTS 2,369,611    Schewing et al. _____ Feb. 13, 1945

OTHER REFERENCES

Beilstein: Hand. der Org. Chem., vol. 21, 4th ed., 1935, p. 341.